US006494651B1

(12) United States Patent
Zhan et al.

(10) Patent No.: US 6,494,651 B1
(45) Date of Patent: Dec. 17, 2002

(54) RAILCAR ANCHOR AND LOAD SNUGGER ARRANGEMENT

(75) Inventors: Mark Y. Zhan, Frankfort, IL (US); Stuart H. Thomson, Downers Grove, IL (US)

(73) Assignee: Holland Company, Crete, IL (US)

( * ) Notice: Subject to any disclaimer, the term of this patent is extended or adjusted under 35 U.S.C. 154(b) by 0 days.

(21) Appl. No.: 09/441,848

(22) Filed: Nov. 17, 1999

Related U.S. Application Data

(60) Provisional application No. 60/134,098, filed on May 14, 1999.

(51) Int. Cl.[7] .................................................. B60P 7/08

(52) U.S. Cl. ....................... 410/116; 410/106; 410/108; 410/109; 410/110; 410/112; 410/115; 410/114

(58) Field of Search ................................ 410/106, 108, 410/109, 110, 112, 113, 114, 115, 116; 24/265 CD; 105/355; 248/499

(56) References Cited

U.S. PATENT DOCUMENTS

| | | | | | |
|---|---|---|---|---|---|
| 1,739,829 | A | * | 12/1929 | Fedderman | 410/116 X |
| 2,226,667 | A | * | 12/1940 | Love | 410/114 |
| 2,581,529 | A | * | 1/1952 | Hall | 410/115 |
| 2,601,103 | A | * | 6/1952 | Dietrichson | 410/113 |
| 2,605,719 | A | * | 8/1952 | Smith et al. | 410/112 |
| 2,755,747 | A | * | 7/1956 | Oakley | 410/108 |
| 2,846,957 | A | * | 8/1958 | Floehr | 410/109 |
| 2,882,837 | A | * | 4/1959 | Methe et al. | 410/114 |
| 2,905,108 | A | * | 9/1959 | Abel | 410/114 |
| 3,190,167 | A | | 6/1965 | Holton | |
| 3,215,390 | A | | 11/1965 | Shetler | |
| 3,604,365 | A | * | 9/1971 | Wall | 410/108 |
| 3,685,778 | A | * | 8/1972 | Berns | 410/116 |
| 3,843,081 | A | * | 10/1974 | Meier et al. | 410/116 |
| 3,845,527 | A | | 11/1974 | Lombardi | |
| 4,645,392 | A | | 2/1987 | Takaguchi | 410/80 |
| 4,762,449 | A | * | 8/1988 | St. Pierre et al. | 410/107 |
| 4,925,226 | A | | 5/1990 | Leonard, Jr. et al. | |
| 4,991,271 | A | | 2/1991 | Bauer et al. | |
| 5,020,948 | A | | 6/1991 | Ihara | 410/105 |
| 5,139,375 | A | | 8/1992 | Franchuk | 410/105 |

* cited by examiner

*Primary Examiner*—Stephen T. Gordon
(74) *Attorney, Agent, or Firm*—David C Brezina; Lee Mann Smith McWilliams Sweeney & Ohlson

(57) ABSTRACT

A railcar load securement apparatus uses an array of load securement anchors having bases adapted for strength and efficiency in mounting in a rail car, a plurality of vertical support members extending upwardly from a mounting base or bracket with a flush mounted anchor plate joining them, so that a plurality of tensioning members or straps can be readily mounted to retain cargo, but the anchor is flush to be unobstructive when unused. Flexibility in load adaptation is provided for in that a number of different load capture arrangements can be utilized.

5 Claims, 4 Drawing Sheets

RAILCAR ANCHOR AND LOAD SNUGGER ARRANGEMENT

CLAIM OF PRIORITY

Priority is claimed based on provisional application Serial No. 60/134,098, filed May 14, 1999.

BACKGROUND OF THE INVENTION

1. Field of the Invention

The invention uses a retrofittable fabricated load securing anchor mounted to railcar beams, cross bearers, and bolsters. The anchor operates in conjunction with load securing scraps arranged to apply securing loads on cargos through a combination of straps, preferably straps in conjunction with resilient load securing pads.

2. Description of Related Art

The most common load securement method for railcars handling cargo such as large heavy items is to load the items on a railcar floor and secure the items with a variety of chains or straps typically using hooks to anchor the securement member (the chain or strap) and toggle and adjustment devices for tensioning.

Often the hooks are attached to the chain or strap and are anchored to eyes, or bars in pockets, or other structural members on the railcar. Additionally, specialized anchors or hooks having generally T-shaped members on the strap or chain fit into corresponding recesses in a railcar floor or, in the case of a flatcar, occasionally into a recessed pocket whereby the head of the "T" bears against a specialized anchor piece in the pocket.

Other load securement practices in the rail industry in the prior art included numerous other mechanical load securement methods such as: blocks, chocks, and specialized mechanical locks often varying depending on a specialized load.

The anchors shown here are preferably mounted in 4 to 10 anchors per car sets. The anchors are preferably mounted in pockets or recesses formed in line with current bulkhead floor track. If there is no floor track, then the anchors can be mounted anywhere along the wall above a major structural floor member.

SUMMARY OF THE INVENTION

A plurality of anchors are arrayed in association with a railcar floor, particularly being affixed to the railcar frame members that support the floor including longitudinal beams, longitudinal beams in association with riser and cross bearer members, and railcar bolsters.

Each anchor consists of a flat plate or channel with four (4) elongated holes to which hooks engage. Preferably these are hooks mounted at the ends of adjustable tensioning straps. These anchors are flat plate or channel which are mounted flush with the insulated car floor so that "slip-sheet" loads do not engage them. The anchors are also designed so that the holes will permit load securement bulkheads to engage the holes if a car is so equipped.

Typically, an array of floor anchors associated with each end and an additional pair associated with the car transverse center line—typically a box car door location—can be used to secure a variety of loads in combination with various railcar arrangements. These include using a plurality of vertically aligned foam pads or other resilient members acting against railcar ends and bulkheads, using opposed straps bearing against one another, particularly at the door position, or using strap tensioning against car ends in the absence of bulkheads. It is also advantageous to support coils on resilient, friction increasing horizontal pads.

DETAILED DESCRIPTION OF THE PREFERRED EMBODIMENT

Figure 1:
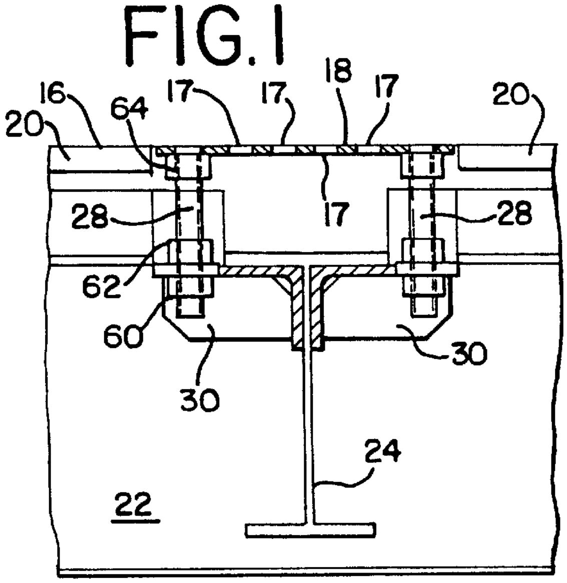
FIG. 1 is a sectional view, in a direction analogous to a side elevation of an anchor of the invention as mounted to a crossbearer.

A railcar 10 has a plurality of anchors or cleats 12, 14 arrayed in association with a floor 16. One form of anchor 12 is affixed to the railcar underframe members that provide strength for the car and also support the floor 16.

It will be noted that bulkhead track 20 customarily associated with a railcar floor 16 is shown in generally schematic form. Typically a pair of tracks 20 are recessed in the floor 16 to enable the fitting of bulkheads and removal or movement or adjustment thereof. The anchors 12, 14 are mounted flush with the insulated car floor 16 so that "slip-sheet" loads do not engage them. The anchors 12, 14 are also designed so that their holes 17 in plate 18 will permit load securement bulkheads to engage the holes 17 if a car is equipped with bulkheads. This is enabled by locating the anchor is in line with the current bulkhead floor track 20. If there is no floor track 20, then the anchors can be mounted anywhere along the car above a major structural floor member.

As will be seen in the discussion below, the general concept of applying flush anchors located in line with bulkhead tracks has evolved into a sophisticated structural arrangement that provides numerous technical advantages. In particular, arrangements for mounting have been developed that take advantage of uniquely configured standardized components and are adapted to fitting as original equipment in railcars of standardized configurations as well as the very significant advantage of retrofitting to existing cars.

Below floor 16, anchors 12 are fixed indirectly to the car's underframe members. For maximum strength these will be located in association with longitudinal beams or side sills 22 supporting cross bearers 24. In particular, anchor 12 has top plate 18 supported by threaded rods 28 on brackets 30. Top plates 18 are formed to be mounted on threaded rods 28 and to be alignable and fixed in position relative to the top surface of floor 16.

Anchor 14 is fitted with a base plate 32 itself mounted on bolster 34 near car end 36. This is also supported by bolts 38. The specific structure used for anchor 12 and 14, in particular their mounting and adjustment, will be described below.

A pair of anchors 14 is mounted at each car end 36. An additional pair of anchors 12 is associated with the car transverse center line typically where the doors are located. Because of the structure of the car underframe, anchors 12, 14 are attached differently, using, alternatively, brackets, 30 or base plates 32.

Figures 5, 6, 7, 8:
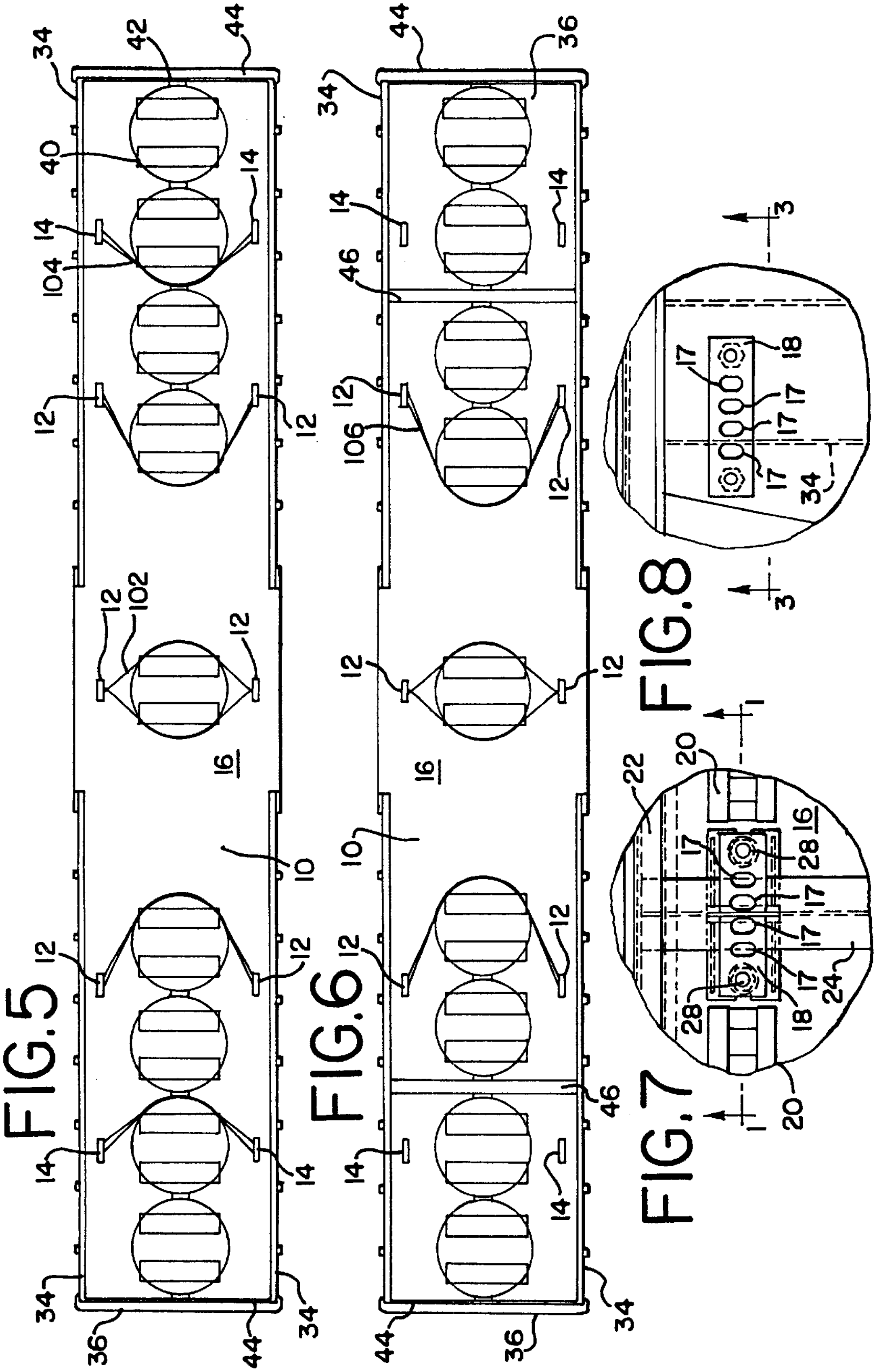
FIG. 5 is a top plan view of a railcar having the anchors of the invention mounted in a car without bulkheads.
FIG. 6 is a top plan view of a railcar having the anchors of the invention mounted in a car with bulkheads.
FIG. 7 is a top plan view of an anchor of the invention as mounted to a crossbearer.
FIG. 8 is a top plan view of an anchor of the invention as mounted to a crossbearer.

As shown in FIGS. 5–6, these anchors 12, 14 can be used to secure a variety of loads. Various railcar load securement arrangements use a plurality of resilient elastomeric pads 40 resting on floor 16 and blocking members or foam pads 42 acting between cargo rolls and against railcar end walls 44 and bulkheads 46, respectively. Preferably, antifriction pads 40 can be a masticated rubber material of a thickness of about ¼". Masticated rubber such as available from Alert Manufacturing specification No. 400 is a combination of rubber and random oriented fiber mixed in sheet form. It is often used in other applications such as wheel well openings, engine compartment barriers, gaskets, splash shields and other similar uses, however its increase in coefficient of friction as a base for cargo coils in rail cars is the advantageous feature used here. Blocking members 42 can preferably be a resilient foam to help absorb buff and draw forces. These can be of numerous alternatives, including, for example, disposable polystyrene foam pads.

Figure 2:
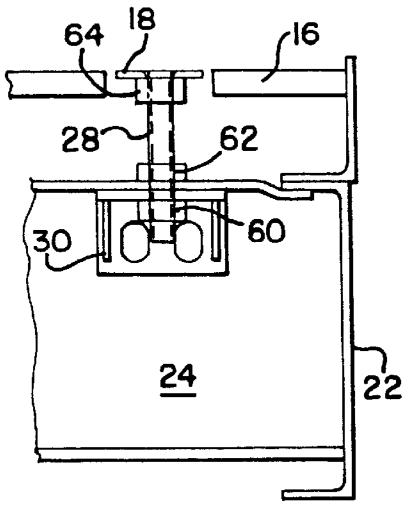
FIG. 2 is a sectional view, in a direction analogous to front elevation of an anchor of the invention as mounted to a crossbearer.
Figure 3:
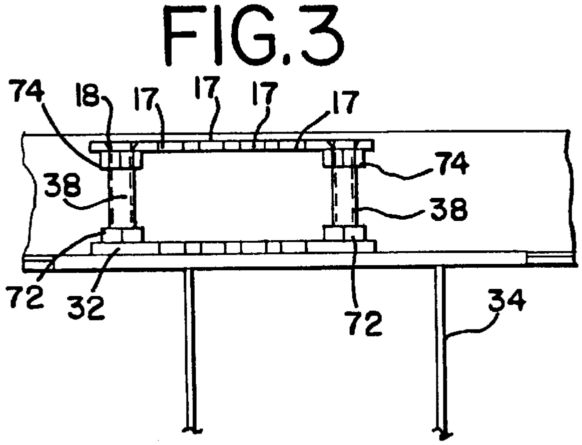
FIG. 3 is a sectional view, in a direction analogous to a side elevation of an anchor of the invention as mounted to a bolster.
Figure 4:
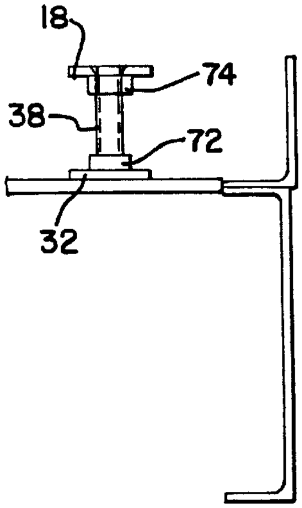
FIG. 4 is a sectional view, in a direction analogous to front elevation of an anchor of the invention as mounted to a bolster.

FIGS. 1, 2 and 7 show the mounting of anchor 12 on brackets 30 and brackets 30 on crossbearer 24.

Figure 14:
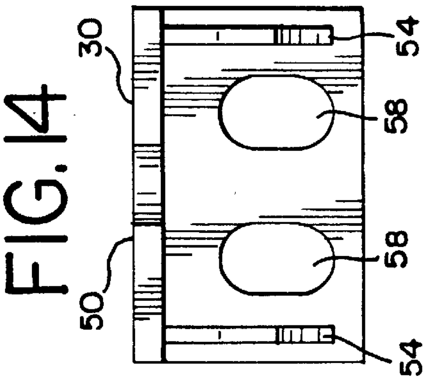
FIG. 14 is a front elevational view of a mounting brace for an anchor of the invention.
Figure 13:
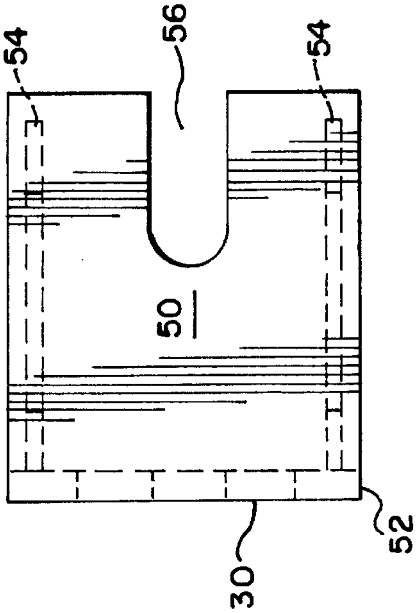
FIG. 13 is a top plan view of a mounting brace for an anchor of the invention.
Figure 12:
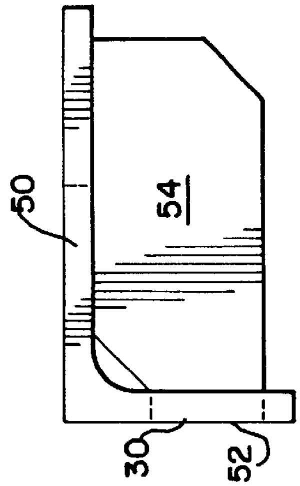
FIG. 12 is a side elevation of a mounting brace for an anchor of the invention.
Figure 15:
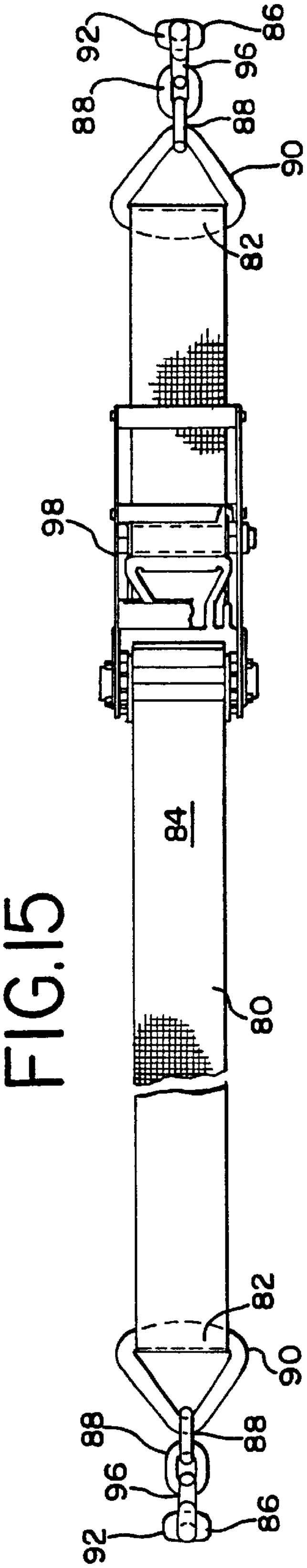
FIG. 15 shows a load securement strap used in the invention.

FIGS. 12–14 show brackets 30 in greater detail. Bracket 30 has angled flanges 50, 52 supported by gussets 54. Flange 50 is formed to provide slot 56 which will receive threaded rod 28 and will serve as a surface to support rod 28. It will be seen that flange 52 is formed to have apertures 58 that provide some lightening and also provide for added edge surfaces which may be welded to crossbearer 24. Flange 52 is thus welded at locations appropriate to give adequate strength without undue heating and distortion of crossbearer 24.

Use of a threaded rod 28 will provide for the placement of a lower nut 60, a center nut 62 and a supporting nut 64. Rod 28 fits slot 56 preferably with center nut 62 fixed in a selected vertical position. Lower nut 60 can then be tightened to fix rod 28 to flange 52 in slot 56. Supporting nut 64 can then be rotated to raise it or lower it, so as to finely adjust the position of plate 18 relative to floor 16. Each nut 60, 62, 64 will preferably be welded in place once each of the described adjustments is made. Plate 18 can then be located for permanent positioning atop the pair of nuts 64.

Plate 18 has, in addition to load securement receiving apertures 17, rod apertures 66. Surrounding apertures 66 are recessed areas 68 preferably formed by machining such as by chamfering. Other methods of forming, whether by casting, stamping or machining could accomplish this, however chamfering is preferred. Areas 68 provide for placement of a welding bead to weld plate 18 to rods 28. The bead will be substantially below the top surface of the plate and can be easily ground flush without substantially reducing the strength of the joint.

FIGS. 3, 4, 8–10 show the assembly and mounting of anchor 14. Base plate 32 is similar in plan form to top plate 18. Base apertures 70 conform in appearance to apertures 17 and can be formed in the same manufacturing steps. However, there is no need for either rod apertures 66 or chamfers 68 as plate 32 is welded to bolster 34. Apertures 70 provide for added edge area for welding, thus an extremely strong weld attachment can be made with minimal complexity in equipment, set up, work area size or the precision in the forming of a hole in floor 16. Bolts 38 have heads 72 welded to plate 32. The use of bolts provides the added mass and surface area of welded head 72 while the threads provide height adjustment in a manner analogous to that described above with respect to anchor 12. Height adjusting nuts 74 are used to position top plate 18 and the structure is then preferably welded.

Figure 9:
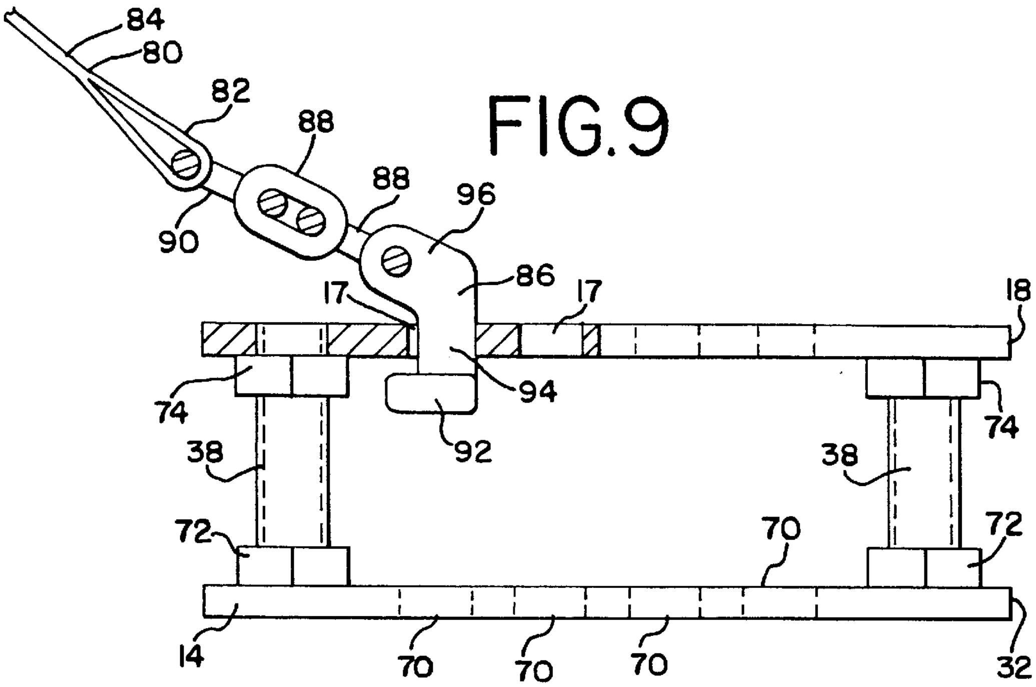
FIG. 9 is a front elevation of an anchor of the invention showing top plate attachment in partial sectional view.
Figure 10:
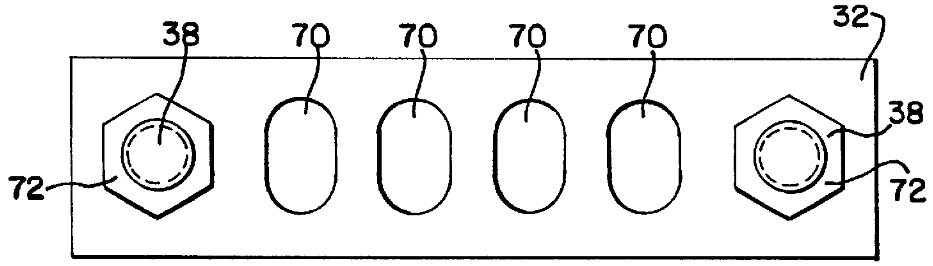
FIG. 10 is a top plan view of the base assembly of a bolster mountable anchor of the invention.
Figure 11:
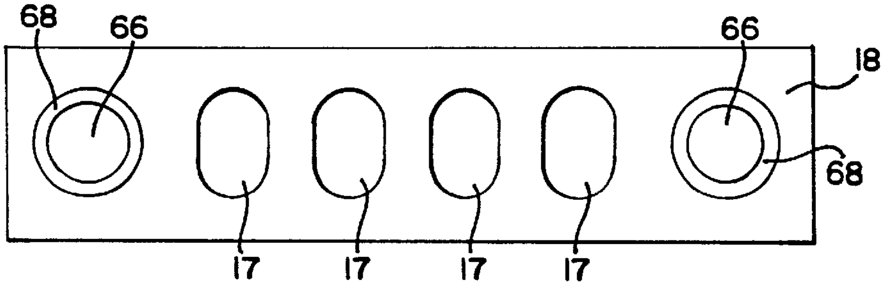
FIG. 11 is a top plan view of a top plate of an anchor of the invention.

Also shown in FIG. 9 is the securement straps 80 formed with loop 82 at the ends of a center web 84. Preferably strap 80 is secured to anchor 12, 14 with a hook device known in the industry as a "B" hook 86. The best strength and economy is obtained using a pair of links 88 for connection to the "B" hook 86 to interconnect with loop 82 through a "D" ring 90. "B" hook 86 has locking lobes 92 which fit through apertures 17, with stem 94 projecting through plate 18 to extend eye portion 96 in the direction of the load. The strap 80 is tensioned using a combination adjuster and toggle 98.

Various strap leads are disclosed and illustrated in FIG. 5 and FIG. 6. A pair of straps 80 can be used in a single coil capture arrangement 102, particularly advantageous at the door anchor location when a car 10 is fully loaded, but also usable for partial loads at the other stations. A pair of coils could be captured by a single strap 80 and compressed against a car end wall 44 in a double coil, end wall capture arrangement 104. This may also be used against a bulkhead 46 at arrangement 106 where the bulkhead 46 holds coils against wall 44. Generally, the anchors 12, 14 can retain a plurality of coils, preferably with a strap assembly 80 per coil, for each tensioning direction. Thus two straps are used in arrangements 104, 106 on a single side, while two straps at arrangement 102 are used, one at each side.

While the present invention has been disclosed and described with reference to a single embodiment thereof, it will be apparent, as noted above that variations and modifications may be made therein. It is also noted that the present invention is independent of the machine being controlled, and is not limited to the control of inserting machines. It is, thus, intended in the following claims to cover each variation and modification that falls within the true spirit and scope of the present invention.

In accordance with our invention we claim:

1. A load restraining anchor for a rail car comprising:

a base weldably mountable to a rail car frame having a vertical support member supporting surface;

a vertical support member mounted to said base and adjustably spacing a top plate support element in a selected vertical position above said base;

a top plate mountable on said vertical support member having a plurality of load securement device receivable apertures and a vertical support member receiving aperture, whereby said anchor is adapted to be fitted to a railcar frame in a pocket in a floor, set so the top plate is flush with the floor and thence fixed in place.

2. The anchor of claim 1 further comprising:

said base is a plate having a longitudinal axis extending between first and second ends and said apertures being of generally oval shape having axes normal to said base plate axis and said vertical support member supporting surface being located near a plate end.

3. The anchor of claim 1 further comprising:

said vertical support member being a first vertical support member and said anchor having a second vertical support member;

each of said first and second vertical support members having a base portion, a spacing portion extending vertically upwards therefrom and an adjustment portion; said second vertical support member having a top plate support element;

each of said top plate support elements carried on said adjustment portion such that each of said vertical support members has a selectable vertical position above said base and each of said first and second vertical supporting members being fixable in said position, thereby providing for both vertical and relative angular adjustment;

said vertical support member thence receiving said top plate in such position of vertical and relative angular adjustment so that said top plate is flush with the floor.

4. The anchor of claim 1 further comprising:

said vertical support member being a first vertical support member and said anchor having a second vertical support member;

said top plate has a longitudinal axis extending between first and second plate ends and said apertures being of generally oval shape having axes normal to said plate axis, a bottom surface, a top surface and first and second vertical support member receiving apertures being located near a plate end;

said plate being formed and arranged so that it is restable on plate supporting elements, and said first and second vertical support member receiving apertures receive a top portion of each of said first and second vertical support members projecting therethrough such that said top portions are fixable to top portions from a car cargo area and are adjustable to be mounted flush with the floor.

5. The anchor of claim 1 further comprising:

said vertical support member being a first vertical support member and said anchor having a second vertical support member;

each of said first and second vertical support members having a base portion, a spacing portion extending vertically upwards therefrom and an adjustment portion; said second vertical support member having a top plate support element;

a respective one of said top plate support elements being carried on each of said adjustment portions such that each of said vertical support members has a vertical position above said base selectable for said vertical position and each of said first and second supporting elements are fixable in said position, thereby providing for both vertical and relative angular adjustment;

said vertical support members thence receiving said top plate in such position of vertical and relative angular adjustment so that said top plate is flush with the floor;

said top plate has a longitudinal axis extending between first and second plate ends and said apertures being of generally oval shape having axes normal to said plate axis, a bottom surface, a top surface and with said first vertical support member receiving aperture and a second vertical support member receiving aperture being located near each plate end;

said top plate being formed and arranged so that it is restable on said vertical support members, and said first and second vertical support member receiving apertures receive a top portion of each of said first and second vertical support members projecting therethrough such that said top portions are fixable to said top portions from a car cargo area and are flush with the floor.

* * * * *